(12) United States Patent
Šačkus et al.

(10) Patent No.: US 12,503,437 B2
(45) Date of Patent: Dec. 23, 2025

(54) 1,1-DIMETHYL-2-[(E)-2-PHENYLETHENYL]-1H-BENZO[E]INDOLE DERIVATIVES AND USES THEREOF

(71) Applicants: Kaunas University of Technology, Kaunas (LT); Palacký University Olomouc, Olomouc (CZ)

(72) Inventors: Algirdas Šačkus, Kaunas (LT); Eglė Arbačiauskienė, Kaunas (LT); Gabrielė Varvuolytė, Kaunas (LT); Sonata Krikštolaitytė, Kaunas (LT); Neringa Kleizienė, Kaunas (LT); Aurimas Bieliauskas, Kaunas (LT); Vladimír Kryštof, Olomouc (CZ); Eva Řezníčkova, Olomouc (CZ); Veronika Vojačkova, Červenka (CZ); Asta Žukauskaitė, Olomouc (CZ)

(73) Assignees: Kaunas University of Technology, Kaunas (LT); Palacky University Olomouc, Olomouc (CZ)

(*) Notice: Subject to any disclaimer, the term of this patent is extended or adjusted under 35 U.S.C. 154(b) by 347 days.

(21) Appl. No.: 18/456,145

(22) Filed: Aug. 25, 2023

(65) Prior Publication Data

US 2025/0066301 A1 Feb. 27, 2025

(51) Int. Cl.
*C07D 209/56* (2006.01)
*A61K 41/00* (2020.01)
*A61P 35/00* (2006.01)

(52) U.S. Cl.
CPC ........ *C07D 209/56* (2013.01); *A61K 41/0057* (2013.01); *A61P 35/00* (2018.01)

(58) Field of Classification Search
CPC .... C07D 209/56; A61P 35/00; A61K 41/0057
USPC ........................................................ 514/411
See application file for complete search history.

(56) References Cited

U.S. PATENT DOCUMENTS

2019/0375941 A1  12/2019  Gulyani et al.

FOREIGN PATENT DOCUMENTS

| CN | 115557878 A | 1/2023 |
|---|---|---|
| CZ | 302829 B6 | 11/2011 |
| CZ | 309070 B6 | 1/2022 |
| LT | 2021528 A | 12/2022 |

OTHER PUBLICATIONS

Algorri et al., Photodynamic Therapy: A Compendium of Latest Reviews, Cancers 13 (2021), 4447, 29 pages.
Gunaydin et al., Photodynamic Therapy—Current Limitations and Novel Approaches, Front. Chem. 9 (2021), 691697, 25 pages.
Correia et al., Photodynamic Therapy Review: Principles, Photosensitizers, Applications, and Future Directions, Pharmaceutics 13 (2021), 1332, 16 pages.
Varvuolytė et al. Synthesis and photodynamic properties of pyrazole-indole hybrids in the human skin melanoma cell line G361, Dyes Pigm. 183 (2020), 108666, 12 pages.
Pham et al., Recent Strategies to Develop Innovative Photosensitizers for Enhanced Photodynamic Therapy, Chem Rev. 121 (2021), 13454, 166 pages.
Ciubini et al., Design and synthesis of symmetrical pentamethine cyanine dyes as NIR photosensitizers for PDT, Dyes Pigm. 160 (2019) 806, 8 pages.
Zhu et al., Zwitterionic AIEgens: Rational Molecular Design for NIR-II Fluorescence Imaging-Guided Synergistic Phototherapy, Adv. Funct. Mater. 31 (2021) 2007026, 12 pages.
Lim et al., Indocyanine green-based photodynamic therapy with 785nm light emitting diode for oral squamous cancer cells, Photodiagnosis Photodyn Ther. 8 (2011) 337, 6 pages.
Shirata et al., Near-infrared photothermal/photodynamic therapy with indocyanine green induces apoptosis of hepatocellular carcinoma cells through oxidative stress Sci Rep. 7 (2017) 13958, 8 pages.
Houthoofd et al., Photodynamic therapy for atherosclerosis. The potential of indocyanine green, PhotodiagnosisPhotodynTher. 29 (2020) 101568, 10 pages.
Liu et al., Colorimetric/spectral dual-mode analysis of sensitive fluorescent probe based on 2,3,3-trimethyl-3H-benzo[e]indole detection of acid pH, Bioorg. Chem. 124 (2022), 105792, 9 pages.
Zhang et al., "Turn-on" ratiometric fluorescent probe: Naked-eye detection of acidic pH and citric acid (CA) by using fluorescence spectrum and its application in real food samples and zebrafish, Spectrochim. Acta A Mol. Biomol. Spectrosc. 261 (2021), 120014, 8 pages.
Zhang et al., Hemicyanine based naked-eye ratiometric fluorescent probe for monitoring lysosomal pH and its application, Spectrochim. Acta A Mol. Biomol. Spectrosc. 227 (2020), 117767, 9 pages.
Fan et al., An indole-carbazole-based ratiometric emission pH fluorescent probefor imaging extreme acidity, Sens. Actuators B Chem. 221 (2015), 1069-1076, 8 pages.
Fan et al., Novel far-visible and near-infrared pH probes based on styrylcyanine for imaging intracellular pH in live cells, Chem. Commun. 48 (2012), 11202-11204, 3 pages.

(Continued)

*Primary Examiner* — Kristin A Vajda
(74) *Attorney, Agent, or Firm* — Koivula & Somersalo, LLC (57) ABSTRACT

The present invention relates to new 1,1-dimethyl-2-[(E)-2-phenylethenyl]-1H-benzo[e]indole derivatives of the general formula I which can be used in photodynamic therapy of cancer.

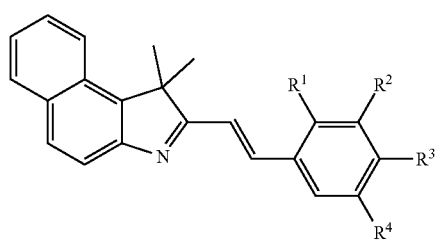

7 Claims, 2 Drawing Sheets (56) References Cited

OTHER PUBLICATIONS

Sun et al., A fluorescent turn-on probe based on benzo[e]indolium for bisulfitethrough 1,4-addition reaction, Sens. Actuators B Chem. 193 (2014), 173, 5 pages.

Divya et al., Multifunctional fluorescent leucomalachite green derivatives for chemodosimetric detection of Fe3+, specific imaging of lipid droplets and intracellular pH monitoring, New J. Chem. 43 (2019), 16349, 10 pages.

1,1-DIMETHYL-2-[(E)-2-PHENYLETHENYL]-1H-BENZO[E]INDOLE DERIVATIVES AND USES THEREOF

FIELD OF THE INVENTION

The invention relates to the field of new 1,1-dimethyl-2-[(E)-2-phenylethenyl]-1H-benzo[e]indole derivatives, methods of production of said new compounds and use of said new compounds in photodynamic therapy of cancer.

BACKGROUND OF THE INVENTION

Photodynamic therapy (PDT) is a promising alternative to invasive or toxic cancer treatments, such as surgical incision, radio-, or chemotherapy. PDT has the potential to treat, for example, gastrointestinal, lung, and skin cancers, as well as non-cancerous diseases like acne, psoriasis, warts, atherosclerosis, periodontitis, also bacterial, viral, and fungal infections. The combination of photosensitizer, light and oxygen generates reactive oxygen species, and as a result causes apoptosis, necrosis of tumor cells, and damage to the vascular structure of the tumor tissue (Algorri et al., Cancers 13 (2021), 4447; Gunaydin et al., Front. Chem. 9 (2021), 691697; Correia et al., Pharmaceutics 13 (2021), 1332; Varvuolytė et al. Dyes Pigm. 183 (2020), 108666; CZ 309070 B6). Ideally, photosensitizers for PDT should have high-yielding singlet oxygen generation, no dark toxicity, but high phototoxicity. However, a lot of current clinical photosensitizers, such as porphyrin and phthalocyanine derivatives, are molecules with large molecular weight and contain atoms of rare metals, which make them more difficult and expensive to synthesize and purify.

Photosensitizers containing a donor-acceptor structure, π-conjugated double bonds, styryl fragments are also known in the literature. Styryl-BODIPY or tetraphenylethylene dyes (Pham et al., Chem Rev. 121 (2021), 13454) or more recently, N-alkylated benzo[e]indole dyes with extended π-conjugation have been reported as potential photosensitizers suitable for photodynamic/photothermal therapy (PDT/PTT) (Ciubini et al., Dyes Pigm. 160 (2019) 806; Zhu et al., Adv. Funct. Mater. 31 (2021) 2007026; US 2019/0375941 A1). Perhaps the most notable example of a benzo[e]indole dye is indocyanine green (ICG), a sulfobutylated benzo[e]indole derivative. ICG has been approved by the U.S. Food and Drug Administration (FDA) as a biological imaging agent, but its photosensitizing and photothermal properties in bacteria and tumors under near-infrared light irradiation are of interest (Lim et al., Photodiagnosis Photodyn Ther. 8 (2011) 337; Shirata et al., Sci Rep. 7 (2017) 13958; Houthoofd et al., Photodiagnosis Photodyn Ther. 29 (2020) 101568). 2-Styryl substituted benzo[e]indoles could be used as fluorescent probes for the imaging of live cells or tissues, and, simultaneously, the detection of intracellular pH changes (CN115557878A; Liu et al., Bioorg. Chem. 124 (2022), 105792; Zhang et al., Spectrochim. Acta A Mol. Biomol. Spectrosc. 261 (2021), 120014; Zhang et al., Spectrochim. Acta A Mol. Biomol. Spectrosc. 227 (2020), 117767; Fan et al., Sens. Actuators B Chem. 221 (2015), 1069-1076; Fan et al., Chem. Commun. 48 (2012), 11202-11204).

The synthesis of such benzo[e]indole derivatives is conducted in refluxing ethanol overnight (Zhang et al., Spectrochim. Acta A Mol. Biomol. Spectrosc. 227 (2020), 117767; Sun et al., Sens. Actuators B Chem. 193 (2014), 173), or in refluxing toluene (Divya et al., New J. Chem. 43 (2019), 16349-16358). Besides conventional batch synthesis, the synthesis in flow reactor, as demonstrated for structurally related styryl-3H-indole derivatives disclosed in (LT2021528 A), can be favorable due to probability of minimizing the side reactions, better sustainability, lower costs, water consumption reduction.

Varvuolytė et al. (Varvuolytė et al., Dyes Pigm. 183 (2020), 108666) describes synthesis of conjugated pyrazole-indole hybrids as a source of photosensitizing compounds with anticancer activity; however, the synthesis of the target compounds requires multiple step procedures including the use of expensive and sensitive metal catalysts, inert reaction conditions, and numerous workup manipulations.

Therefore, there remains a need for small, easily preparable, metal atom free molecules capable of excellent photosensitizing properties that can precisely target the irradiated cancer cells without causing side effects or collateral damage to healthy tissues.

SUMMARY OF THE INVENTION

The aim of present invention is to provide new compounds, which possess photodynamic properties making them applicable to be used in therapy, for example, as anticancer agents.

The present invention provides a series of novel substituted 1,1-dimethyl-2-[(E)-2-phenylethenyl]-1H-benzo[e]indole derivatives that are suitable for photodynamic therapy. Such compounds were shown to be active for inducing apoptosis in mammalian cells and can be used as anticancer photosensitizing agents in treatment of, for example, skin and epithelial tumors accessible to light irradiation.

The object of the invention is 1,1-dimethyl-2-[(E)-2-phenylethenyl]-1H-benzo[e]indole derivatives of general formula I:

I wherein:
$R^1$ is hydrogen or substituent, selected from $NO_2$ or Cl;
$R^2$ is hydrogen or substituent selected from F, $NO_2$ or $CF_3$;
$R^3$ is hydrogen or substituent selected from F, Cl, $OCH_3$, $CF_3$ or $CH_3$, or $R^3$ is CN on the proviso, that at least $R^2$ is F; or $R^2$ is CN on the proviso, that $R^3$ represents F;
$R^4$ is hydrogen or substituent selected from $CF_3$ or $NO_2$;
or alternatively $R^1$ and $R^2$ or $R^2$ and $R^3$ together are forming a chain of —CH=CH—CH=CH—.

The following derivatives of formula I are particularly preferred:
1,1-Dimethyl-2-[(E)-2-phenylethenyl]-1H-benzo[e]indole (3a);
2-{(E)-2-[3,5-Bis(trifluoromethyl)phenyl]ethenyl}-1,1-dimethyl-1H-benzo[e]indole (3b);
2-[(E)-2-(2-Chloro-5-nitrophenyl)ethenyl]-1,1-dimethyl-1H-benzo[e]indole (3c);
2-[(E)-2-(4-Fluorophenyl)ethenyl]-1,1-dimethyl-1H-benzo[e]indole (3d);

1,1-Dimethyl-2-{(E)-2-[4-(trifluoromethyl)phenyl]ethenyl}-1H-benzo[e]indole (3e);

2-[(E)-2-(4-Methoxy-3-nitrophenyl)ethenyl]-1,1-dimethyl-1H-benzo[e]indole (3f);

4-[(E)-2-(1,1-Dimethyl-1H-benzo[e]indol-2-yl)ethenyl]-2-fluorobenzonitrile (3g);

2-[(E)-2-(4-Chloro-3-nitrophenyl)ethenyl]-1,1-dimethyl-1H-benzo[e]indole (3h);

2-(E)-2-(4-Fluoro-3-nitrophenyl)ethenyl-1,1-dimethyl-1H-benzo[e]indole (3i);

5-[(E)-2-(1,1-Dimethyl-1H-benzo[e]indol-2-yl)ethenyl]-2-fluorobenzonitrile (3j);

1,1-Dimethyl-2-[(E)-2-(4-methyl-3-nitrophenyl)ethenyl]-1H-benzo[e]indole (3k);

1,1-Dimethyl-2-[(E)-2-(naphthalen-2-yl)ethenyl]-1H-benzo[e]indole (3l);

1,1-Dimethyl-2-[(E)-2-(3-nitrophenyl)ethenyl]-1H-benzo[e]indole (3m);

1,1-Dimethyl-2-{(E)-2-[3-(trifluoromethyl)phenyl]ethenyl}-1H-benzo[e]indole (3n);

1,1-Dimethyl-2-[(E)-2-(naphthalen-1-yl)ethenyl]-1H-benzo[e]indole (3o);

1,1-Dimethyl-2-[(E)-2-(2-nitrophenyl)ethenyl]-1H-benzo[e]indole (3p);

It is another object of this invention to provide 1,1-dimethyl-2-[(E)-2-phenylethenyl]-1H-benzo[e]indole derivatives of the general formula I for inducing apoptosis in cancer cells.

It is an important object of this invention to provide 1,1-dimethyl-2-[(E)-2-phenylethenyl]-1H-benzo[e]indole derivatives of the general formula I for use in therapy, particularly in photodynamic therapy. It is an object of this invention to provide 1,1-dimethyl-2-[(E)-2-phenylethenyl]-1H-benzo[e]indole derivatives of the general formula I for use as photosensitizers in the treatment of cancer, particularly of skin cancer.

It is another object of this invention to provide 1,1-dimethyl-2-[(E)-2-phenylethenyl]-1H-benzo[e]indole derivatives of the general formula I as anticancer agents in combination with light irradiation.

DETAILED DESCRIPTION OF THE INVENTION

Compounds of the current invention comprise general formula I:

wherein:

$R^1$ is hydrogen or substituent, selected from $NO_2$ or Cl;

$R^2$ is hydrogen or substituent selected from F, $NO_2$ or $CF_3$;

$R^3$ is hydrogen or substituent selected from F, Cl, $OCH_3$, $CF_3$ or $CH_3$, or $R^3$ is CN on the proviso, that at least $R^2$ is F; or $R^2$ is CN on the proviso, that $R^3$ represents F;

$R^4$ is hydrogen or substituent selected from $CF_3$ or $NO_2$;

or alternatively $R^1$ and $R^2$ or $R^2$ and $R^3$ together are forming a chain of —CH=CH—CH=CH—.

Said compounds of general formula I are obtainable according to general scheme given below:

General Synthesis Procedure for Compounds 3a-p 1,1,2-Trimethyl-1H-benzo[e]indole (1) (1 mmol, 1 eq.) was dissolved in ethanol (2 mL) and appropriate aldehyde 2 (1-1.5 mmol, 1-1.5 eq.), piperidine (0.09 mL) and acetic acid (0.1 mL) or triethylamine (0.06 mL, for compound 3i) were added. The reaction mixture was stirred at reflux for 24 h (48 h for compound 3o). Upon cooling, the solvent was removed under reduced pressure and the residue was subjected to column chromatography on silica gel or recrystallized from ethanol to give pure target compounds 3a-p.

EMBODIMENTS OF THE INVENTION

The invention is further described in the following examples, which are offered for illustrative purposes only, and are not intended to limit the scope of the invention in any way.

Example No. 1. 1,1-Dimethyl-2-[(E)-2-phenylethenyl]-1H-benzo[e]indole (3a)

Compound was synthesized according to the general synthesis procedure using benzaldehyde 2a (0.15 mL, 1.5 mmol), piperidine (0.09 mL) and acetic acid (0.1 mL). After flash chromatography on silica gel (eluent-n-hexane/ethyl acetate 9/1 v/v), 3a was obtained as a yellow solid (233 mg, 83% yield).

$^1$H NMR (700 MHZ, CDCl$_3$): δ 8.06 (d, J=8.3 Hz, 1H), 7.95 (d, J=6.9 Hz, 1H), 7.90-7.83 (m, 3H), 7.65 (d, J=7.4 Hz, 2H), 7.56 (ddd, J=8.2, 6.7, 1.3 Hz, 1H), 7.45 (ddd, J=8.1, 6.8, 1.1 Hz, 1H), 7.41 (t, J=7.6 Hz, 2H), 7.38-7.33 (m, 1H), 7.15 (d, J=16.2 Hz, 1H), 1.69 (s, 6H). $^{13}$C NMR (176 MHz, CDCl$_3$): δ 185.0, 151.2, 139.5, 137.6, 136.1, 132.6, 129.7, 129.3, 129.2, 128.9, 128.5, 127.5, 126.4, 124.6, 122.8, 120.4, 119.1, 54.4, 23.1. IR (neat, ν$_{max}$, cm$^{-1}$): 3056, 3038, 3023, 2977, 2968, 2931, 2868 (CH$_{arom}$, CH$_{aliph}$), 1624, 1575, 1509, 1501, 1459, 1441, 1390, 1372, 1254, 1204, 1099, 1022, 968, 858, 818, 743 (C=C, CH$_3$ bending, C—N, CH$_{arom}$ oop bending). HRMS (ESI-TOF) for C$_{22}$H$_{20}$N ([M+H]$^+$) calcd, 298.1590, found 298.1592. M.p. 104-105° C. R$_f$=0.38 (n-hexane/ethylacetate 6/1 v/v).

Example No. 2. 2-{(E)-2-[3,5-Bis(trifluoromethyl)phenyl]ethenyl}-1,1-dimethyl-1H-benzo[e]indole (3b)

Compound 3b was synthesized according to the general synthesis procedure using 3,5-bis(trifluoromethyl)benzaldehyde 2b (0.19 mL, 1.2 mmol). After precipitation with ethanol 3b was obtained as a yellow solid (209 mg, 48% yield).

$^1$H NMR (700 MHZ, CDCl$_3$): δ 8.07 (d, J=8.4 Hz, 1H), 8.04 (s, 2H), 7.98 (d, J=8.2 Hz, 1H), 7.91 (d, J=8.5 Hz, 1H), 7.89-7.83 (m, 3H), 7.59 (t, J=7.6 Hz, 1H), 7.52-7.47 (m, 1H), 7.26 (d, J=3.3 Hz, 1H), 1.72 (s, 6H). $^{13}$C NMR (176 MHz, CDCl$_3$): δ 183.8, 151.0, 139.9, 138.3, 133.8, 132.9, 132.4 (q, $^2J_{CF}$=33.2 Hz), 129.8, 129.4, 128.5, 127.0 (q, $^3J_{CF}$=3.7 Hz), 126.6, 125.0, 123.2 (q, $^1J_{CF}$=272.8 Hz), 122.9, 122.8, 122.3 (p, J=3.6 Hz), 120.5, 54.5, 22.9. IR (neat, ν$_{max}$, cm$^{-1}$): 3045, 2971, 2917, 2872 (CH$_{arom}$, CH$_{aliph}$), 1467, 1381, 1166, 1116, 955, 932, 888, 844, 816, 745 (C=C, CH$_3$ bending, C—N, CH$_{arom}$ oop bending). HRMS (ESI-TOF) for C$_{24}$H$_{18}$F$_6$N ([M+H]$^+$) calcd, 434.1338, found 434.1336. M.p. 162-163° C. R$_f$=0.57 (n-hexane/ethylacetate 6/1 v/v).

Example No. 3. 2-[(E)-2-(2-Chloro-5-nitrophenyl)ethenyl]-1,1-dimethyl-1H-benzo[e]indole (3c)

Compound 3c was synthesized according to the general synthesis procedure using 2-chloro-5-nitrobenzaldehyde 2c (278 mg, 0.716 mmol). After recrystallization from ethanol 3c was obtained as a yellow solid (289 mg, 77% yield).

$^1$H NMR (700 MHz, CDCl$_3$): δ 8.65 (d, J=2.6 Hz, 1H), 8.18-8.06 (m, 3H), 7.98 (d, J=8.2 Hz, 1H), 7.90 (q, J=8.5 Hz, 2H), 7.65-7.57 (m, 2H), 7.52-7.47 (m, 1H), 7.30-7.24 (m, 1H), 1.74 (s, 6H). $^{13}$C NMR (176 MHz, CDCl$_3$): δ 183.7, 151.0, 146.9, 140.6, 140.1, 135.9, 132.9, 131,1, 130.8, 129.8, 129.4, 128.4, 126.6, 125.1, 124.7, 123.9, 122.9, 121.8, 120.7, 54.6, 23.1. IR (neat, ν$_{max}$, cm$^{-1}$): 3075, 2971, 2933, 2865, 1519, 1347 (—NO$_2$), 967, 829, 746, 740. HRMS (ESI-TOF) for C$_{22}$H$_{18}$ClN$_2$O$_2$ ([M+H]$^+$) calcd, 377.1051, found 377.1048. M.p. 191-192° C. (decomp.) R$_f$=0.38 (n-hexane/ethylacetate 6/1 v/v).

Example No. 4. 2-[(E)-2-(4-Fluorophenyl)ethenyl]-1,1-dimethyl-1H-benzo[e]indole (3d)

Compound 3d was synthesized according to the general synthesis procedure using 4-fluorobenzaldehyde 2d (0.15 mL, 1.5 mmol). After flash chromatography on silica gel (eluent-n-hexane/ethyl acetate 6/1 v/v), 3d was obtained as a yellow amorphous material (216 mg, 69% yield).

$^1$H NMR (700 MHz, CDCl$_3$): δ 8.05 (d, J=8.4 Hz, 1H), 7.95 (d, J=8.3 Hz, 1H), 7.89-7.84 (m, 2H), 7.82 (d, J=16.2 Hz, 1H), 7.63-7.59 (m, 2H), 7.58-7.53 (m, 1H), 7.47-7.42 (m, 1H), 7.12-7.07 (m, 2H), 7.05 (d, J=16.2 Hz, 1H), 1.68 (s, 6H). $^{13}$C NMR (176 MHz, CDCl$_3$): δ 184.9, 163.3 (d, $^1J_{CF}$=249.9 Hz), 151.2, 139.4, 136.3, 132.6, 132.4 (d, $^4J_{CF}$=3.3 Hz), 129.7, 129.2 (d, $^3J_{CF}$=7.9 Hz), 128.5, 126.4, 124.6, 122.8, 120.4, 118.76, 118.75, 116.0 (d, $^2J_{CF}$=21.7 Hz), 54.4, 23.1. IR (neat, ν$_{max}$, cm$^{-1}$): 3068, 3047, 2971, 2930, 2868 (CH$_{arom}$, CH$_{aliph}$), 1627, 1596, 1507, 1464, 1442, 1414, 1390, 1226, 1158, 1098, 977, 966, 863, 821, 749 (C=C, CH$_3$ bending, C—N, CH$_{arom}$ oop bending). HRMS (ESI-TOF) for C$_{22}$H$_{19}$FN ([M+H]$^+$) calcd, 316.1496, found 316.1499. R$_f$=0.46 (n-hexane/ethylacetate 4/1 v/v).

Example No. 5. 1,1-Dimethyl-2-{(E)-2-[4-(trifluoromethyl)phenyl]ethenyl}-1H-benzo[e]indole (3e)

Compound 3e was synthesized according to the general synthesis procedure using 4-(trifluoromethyl)benzaldehyde 2e (0.16 mL, 1.2 mmol). After recrystallization from ethanol 3e was obtained as a yellow solid (92 mg, 25% yield).

$^1$H NMR (700 MHZ, CDCl$_3$): δ 8.07 (d, J=8.4 Hz, 1H), 7.97 (d, J=8.2 Hz, 1H), 7.92-7.84 (m, 3H), 7.74 (d, J=8.0 Hz, 2H), 7.67 (d, J=8.0 Hz, 2H), 7.61-7.56 (m, 1H), 7.48 (t, J=7.5 Hz, 1H), 7.21 (d, J=16.2 Hz, 1H), 1.70 (s, 6H). $^{13}$C NMR (176 MHZ, CDCl$_3$): δ 184.4, 151,1, 139.6 (d, J=27.2 Hz), 135.7, 132.8, 130.7 (q, $^2J_{CF}$=32.5 Hz), 129.8, 129.3, 128.5, 127.6, 126.5, 126.3, 125.9 (q, $^3J_{CF}$=3.8 Hz), 124.8, 124.0 (q, $^1J_{CF}$=272.0 Hz), 122.8, 121.4, 120.5, 54.5, 23.0. IR (neat, ν$_{max}$, cm$^{-1}$): 3047, 2978, 2934, 2869 (CH$_{arom}$, CH$_{aliph}$), 1611, 1512, 1497, 1461, 1321, 1163, 1128, 1109, 1065, 971, 818, 747 (C═C, CH$_3$ bending, C—N, CH$_{arom}$ oop bending). HRMS (ESI-TOF) for C$_{23}$H$_{19}$F$_3$N ([M+H]$^+$) calcd, 366.1464, found 366.1467. M.p. 156-157° C. R$_f$=0.37 (n-hexane/ethylacetate 6/1 v/v).

Example No. 6. 2-[(E)-2-(4-Methoxy-3-nitrophenyl)ethenyl]-1,1-dimethyl-1H-benzo[e]indole (3f)

Compound 3f was synthesized according to the general synthesis procedure using 4-methoxy-3-nitrobenzaldehyde 2f (216 mg, 1.2 mmol). After recrystallization from ethanol 3f was obtained as an orange solid (287 mg, 77% yield).

$^1$H NMR (700 MHZ, CDCl$_3$): δ 8.16 (d, J=2.3 Hz, 1H), 8.06 (d, J=8.4 Hz, 1H), 7.96 (d, J=8.2 Hz, 1H), 7.91-7.83 (m, 2H), 7.82-7.75 (m, 2H), 7.58 (dd, J=8.4, 6.7 Hz, 1H), 7.50-7.45 (m, 1H), 7.14 (d, J=8.7 Hz, 1H), 7.07 (d, J=16.2 Hz, 1H), 4.02 (s, 3H), 1.69 (s, 6H). $^{13}$C NMR (176 MHz, CDCl$_3$): δ 184.4, 153.3, 151,1, 140.0, 139.6, 134.4, 133.3, 132.7, 129.7, 129.3, 129.0, 128.5, 126.5, 124.8, 124.0, 122.8, 120.4, 119.6, 113.9, 56.8, 54.4, 23.0. IR (neat, ν$_{max}$, cm$^{-1}$): 3051, 2967, 2942, 2838 (CH$_{arom}$, CH$_{aliph}$), 1611, 1528, 1498, 1461, 1437, 1348, 1307, 1266, 1256, 1205, 1185, 1164, 1082, 1006, 965, 874, 830, 817, 767, 756 (—NO$_2$ stretch, C═C, CH$_3$ bending, C—O, C—N, CH$_{arom}$ oop bending). HRMS (ESI-TOF) for C$_{23}$H$_{21}$N$_2$O$_3$ ([M+H]$^+$) calcd, 373.1547, found 373.1550. M.p. 197-198° C. R$_f$=0.33 (n-hexane/ethylacetate 1/1 v/v).

Example No. 7. 4-[(E)-2-(1,1-Dimethyl-1H-benzo[e]indol-2-yl)ethenyl]-2-fluorobenzonitrile (3g)

Compound 3g was synthesized according to the general synthesis procedure using 4-cyano-3-fluorobenzaldehyde 2g (148 mg, 1 mmol). After flash chromatography on silica gel (eluent-n-hexane/ethyl acetate 5/3 v/v), 3g was obtained as a yellow-orange solid (80 mg, 24% yield). $^1$H NMR (700 MHZ, CDCl$_3$): δ 8.06 (d, J=8.4 Hz, 1H), 7.97 (d, J=8.2 Hz, 1H), 7.91 (d, J=8.5 Hz, 1H), 7.87 (d, J=8.5 Hz, 1H), 7.79 (d, J=16.2 Hz, 1H), 7.65 (dd, J=8.0, 6.5 Hz, 1H), 7.62-7.57 (m, 1H), 7.52-7.47 (m, 2H), 7.45 (d, J=9.8 Hz, 1H), 7.21 (d, J=16.2 Hz, 1H), 1.69 (s, 6H). $^{13}$C NMR (176 MHZ, CDCl$_3$): δ 183.6, 163.4 (d, $^1J_{CF}$=259.1 Hz), 150.9, 143.4 (d, $^3J_{CF}$=7.8 Hz), 139.9, 133.9 (d, $^4J_{CF}$=2.3 Hz), 133.8, 132.9, 129.8, 129.5, 128.4, 126.6, 125.1, 123.8, 123.7, 123.6, 122.9, 120.5, 114.4 (d, $^2J_{CF}$=20.1 Hz), 113.9, 101,10 (d, J=15.7 Hz), 54.5, 22.8. IR (neat, ν$_{max}$, cm$^{-1}$): 3047, 2984, 2976, 2934, 2866, 2231 (—CN), 1612, 1559, 1504, 1488, 1428, 1108, 962, 872, 825, 761. HRMS (ESI-TOF) for C$_{23}$H$_{18}$FN$_2$ ([M+H]$^+$) calcd, 341,1449, found 341,1446. M.p. 198-199° C. R$_f$=0.11 (n-hexane/ethylacetate 6/1 v/v).

Example No. 8. 2-[(E)-2-(4-Chloro-3-nitrophenyl)ethenyl]-1,1-dimethyl-1H-benzo[e]indole (3h)

Compound 3h was synthesized according to the general synthesis procedure using 4-chloro-3-nitrobenzaldehyde 2h (222 mg, 1.2 mmol). After recrystallization from ethanol 3h was obtained as a yellow solid (139 mg, 37% yield).

$^1$H NMR (700 MHZ, CDCl$_3$): δ 8.13 (s, 1H), 8.06 (d, J=8.4 Hz, 1H), 7.97 (d, J=8.2 Hz, 1H), 7.93-7.84 (m, 2H), 7.80 (d, J=16.2 Hz, 1H), 7.73 (d, J=7.7 Hz, 1H), 7.59 (dd, J=8.2, 5.2 Hz, 2H), 7.49 (t, J=7.5 Hz, 1H), 7.18 (d, J=16.2 Hz, 1H), 1.69 (s, 6H). $^{13}$C NMR (176 MHz, CDCl$_3$): δ 183.8, 151.0, 148.3, 139.8, 136.3, 133.4, 132.9, 132.4, 131.6, 129.8, 129.4, 128.5, 127.0, 126.6, 125.0, 123.7, 122.9, 122.2, 120.5, 54.5, 22.8. IR (neat, ν$_{max}$, cm$^{-1}$): 3047, 2969, 2930, 2865 (CH$_{arom}$, CH$_{aliph}$), 1557, 1527, 1500, 1340, 1206, 1130, 1044, 959, 830, 817, 754, 726 (—NO$_2$ stretch, C═C, CH$_3$ bending, C—N, CH$_{arom}$ oop bending). HRMS (ESI-TOF) for C$_{22}$H$_{18}$ClN$_2$O$_2$ ([M+H]$^+$) calcd, 377.1051, found 377.1049. M.p. 179-180° C. R$_f$=0.14 (n-hexane/ethylacetate 6/1 v/v).

Example No. 9. 2-(E)-2-(4-Fluoro-3-nitrophenyl)ethenyl-1,1-dimethyl-1H-benzo[e]indole (3i)

Compound 3i was synthesized according to the general synthesis procedure using 4-fluoro-3-nitrobenzaldehyde 2i and TEA. After recrystallization from ethanol 3i was obtained as a yellow solid (197 mg, 55% yield).

$^1$H NMR (700 MHZ, CDCl$_3$): δ 8.37-8.29 (m, 1H), 8.06 (d, J=8.4 Hz, 1H), 7.97 (d, J=8.1 Hz, 1H), 7.93-7.78 (m, 4H), 7.59 (t, J=7.6 Hz, 1H), 7.49 (t, J=7.4 Hz, 1H), 7.35 (t, J=9.4 Hz, 1H), 7.15 (d, J=16.2 Hz, 1H), 1.70 (s, 6H). $^{13}$C NMR (176 MHZ, CDCl$_3$): δ 183.9, 155.4 (d, J=268.0 Hz), 150.9, 139.7, 137.8 (d, J=7.8 Hz), 134.1 (d, J=8.4 Hz), 133.45 (d, J=4.4 Hz), 133.4, 132.8, 129.8, 129.4, 128.5, 126.6, 125.0, 124.2 (d, J=2.6 Hz), 122.9, 121.7 (d, J=2.4 Hz), 120.4, 119.1 (d, J=21.4 Hz), 54.5, 22.8. IR (neat, ν$_{max}$, cm$^{-1}$): 3032, 2982, 2972, 2931, 2867, 1613, 1533, 1504, 1348, 1255, 1082, 958, 819, 758. HRMS (ESI-TOF) for C$_{22}$H$_{18}$FN$_2$O$_2$ ([M+H]$^+$) calcd, 361,1347, found 361,1345. M.p. 201-202° C. (decomp.) R$_f$=0.13 (n-hexane/ethylacetate 6/1 v/v).

Example No. 10. 5-[(E)-2-(1,1-Dimethyl-1H-benzo[e]indol-2-yl)ethenyl]-2-fluorobenzonitrile (3j)

Compound 3j was synthesized according to the general synthesis procedure using 3-cyano-4-fluorobenzaldehyde 2j (224 mg, 1.5 mmol). After flash chromatography on silica gel (eluent-n-hexane/ethyl acetate 6/1 v/v), 3j was obtained as an orange amorphous material (111 mg, 33% yield).

$^1$H NMR (700 MHz, CDCl$_3$): δ 8.08-8.04 (m, 1H), 7.97 (d, J=8.3 Hz, 1H), 7.92-7.81 (m, 4H), 7.78 (d, J=16.2 Hz, 1H), 7.58 (t, J=7.6 Hz, 1H), 7.48 (t, J=7.5 Hz, 1H), 7.26 (d, J=7.7 Hz, 1H), 7.09 (d, J=16.2 Hz, 1H), 1.69 (s, 6H). $^{13}$C NMR (176 MHz, CDCl$_3$): δ 184.0, 163.0 (d, J=262.5 Hz), 150.9, 139.6, 133.64 (d, J=8.3 Hz), 133.57 (d, J=3.9 Hz), 133.5, 132.8, 132.0, 129.8, 129.4, 128.5, 126.6, 124.9, 122.9, 121.1 (d, J=2.5 Hz), 120.4, 117.2 (d, J=20.1 Hz), 113.6, 54.5, 22.8. IR (neat, ν$_{max}$, cm$^{-1}$): 3056, 2965, 2928, 2865, 2238 (—CN), 1497, 1464, 1249, 1113, 1099, 975, 817, 755. HRMS (ESI-TOF) for C$_{23}$H$_{18}$FN$_2$ ([M+H]$^+$) calcd, 341,1449, found 341,1452. R$_f$=0.13 (n-hexane/ethylacetate 6/1 v/v).

Example No. 11. 1,1-Dimethyl-2-[(E)-2-(4-methyl-3-nitrophenyl)ethenyl]-1H-benzo[e]indole (3k)

Compound 3k was synthesized according to the general synthesis procedure using 4-methyl-3-nitrobenzaldehyde 2k (247 mg, 0.716 mmol). After recrystallization from ethanol 3k was obtained as a yellow solid (295 mg, 83% yield).

$^1$H NMR (700 MHZ, CDCl$_3$): δ 8.25 (d, J=1.9 Hz, 1H), 8.07 (d, J=8.4 Hz, 1H), 7.96 (d, J=8.2 Hz, 1H), 7.92-7.80 (m, 3H), 7.73 (dd, J=7.9, 1.9 Hz, 1H), 7.58 (t, J=6.9 Hz, 1H), 7.48 (t, J=6.9 Hz, 1H), 7.39 (d, J=7.9 Hz, 1H), 7.18 (d, J=16.2 Hz, 1H), 2.64 (s, 3H), 1.70 (s, 6H). $^{13}$C NMR (176 MHZ, CDCl$_3$): δ 184.3, 151.0, 149.6, 139.7, 135.5, 134.6, 134.2, 133.4, 132.8, 131.6, 129.7, 129.3, 128.5, 126.5, 124.8, 123.0, 122.9, 120.9, 120.4, 54.5, 22.9, 20.5. IR (neat, ν$_{max}$, cm$^{-1}$): 3054, 2974, 2932, 2868, 1525, 1503, 1439, 1340, 967, 822, 755. HRMS (ESI-TOF) for C$_{23}$H$_{21}$N$_2$O$_2$ ([M+H]$^+$) calcd, 357.1598, found 357.1595. M.p. 185-186° C. R$_f$=0.19 (n-hexane/ethylacetate 6/1 v/v).

Example No. 12. 1,1-Dimethyl-2-[(E)-2-(naphthalen-2-yl)ethenyl]-1H-benzo[e]indole (3l)

Compound 3l was synthesized according to the general synthesis procedure using 2-naphthaldehyde 2l (156 mg, 1 mmol). After flash chromatography on silica gel (eluent-n-hexane/ethyl acetate 6/1 v/v), 3l was obtained as a yellow amorphous material (144 mg, 63% yield).

$^1$H NMR (700 MHZ, CDCl$_3$): δ 8.07 (d, J=7.9 Hz, 1H), 8.02 (d, J=16.4 Hz, 2H), 7.96 (d, J=8.2 Hz, 1H), 7.92-7.80 (m, 6H), 7.60-7.54 (m, 1H), 7.54-7.44 (m, 3H), 7.29-7.24 (m, 1H), 1.73 (s, 6H). $^{13}$C NMR (176 MHz, CDCl$_3$): δ 185.1, 151.3, 139.6, 137.7, 133.8, 133.6, 133.5, 132.6, 129.7, 129.2, 128.9, 128.6, 128.5, 128.4, 127.8, 126.8, 126.6, 126.4, 124.6, 123.4, 122.8, 120.4, 119.3, 54.4, 23.2. IR (neat, ν$_{max}$, cm$^{-1}$): 3048, 3017, 2987, 2970, 2936, 2868 (CH$_{arom}$, CH$_{aliph}$), 1496, 1461, 1365, 1206, 973, 901, 847, 823, 811, 742 (C═C, CH$_3$ bending, C—N, CH$_{arom}$ oop bending). HRMS (ESI-TOF) for C$_{26}$H$_{22}$N ([M+H]$^+$) calcd, 348.1747, found 348.1749. R$_f$=0.48 (n-hexane/ethylacetate 4/1 v/v).

Example No. 13. 1,1-Dimethyl-2-[(E)-2-(3-nitrophenyl)ethenyl]-1H-benzo[e]indole (3m)

Compound 3m was synthesized according to the general synthesis procedure using 3-nitrobenzaldehyde 2m (180 mg, 1.2 mmol). After recrystallization from ethanol 3m was obtained as a yellow solid (280 mg, 82% yield).

$^1$H NMR (700 MHZ, CDCl$_3$): δ 8.51 (s, 1H), 8.20 (d, J=8.1 Hz, 1H), 8.07 (d, J=8.4 Hz, 1H), 7.97 (d, J=8.2 Hz, 1H), 7.93-7.85 (m, 4H), 7.59 (q, J=6.9, 6.2 Hz, 2H), 7.51-7.47 (m, 1H), 7.25 (d, J=15.3 Hz, 1H), 1.72 (s, 6H). $^{13}$C NMR (176 MHZ, CDCl$_3$): δ 184.1, 151.0, 148.8, 139.7, 137.9, 134.6, 133.4, 132.8, 129.9, 129.8, 129.4, 128.5, 126.6, 124.9, 123.5, 122.9, 121.8, 121.6, 120.5, 54.5, 22.9. IR (neat, ν$_{max}$, cm$^{-1}$): 3081, 3048, 2976, 2966, 2931, 2866 (CH$_{arom}$, CH$_{aliph}$), 1522, 1465, 1437, 1346, 1203, 964, 826, 809, 754, 737 (—NO$_2$ stretch, C═C, CH$_3$ bending, C—N, CH$_{arom}$ oop bending). HRMS (ESI-TOF) for C$_{22}$H$_{19}$N$_2$O$_2$ ([M+H]$^+$) calcd, 343.1441, found 343.1439. M.p. 176-177° C. R$_f$=0.11 (n-hexane/ethylacetate 6/1 v/v).

Example No. 14. 1,1-Dimethyl-2-{(E)-2-[3-(trifluoromethyl)phenyl]ethenyl}-1H-benzo[e]indole (3n)

Compound 3n was synthesized according to the general synthesis procedure using 3-(trifluoromethyl)benzaldehyde 2n (0.2 mL, 1.5 mmol). After flash chromatography on silica gel (eluent-n-hexane/ethyl acetate 6/1 v/v), 3n was obtained as a yellow amorphous material (310 mg, 85% yield).

$^1$H NMR (700 MHZ, CDCl$_3$): δ 8.07 (d, J=8.0 Hz, 1H), 7.96 (d, J=8.2 Hz, 1H), 7.92-7.84 (m, 4H), 7.79 (d, J=7.7 Hz, 1H), 7.62-7.51 (m, 3H), 7.50-7.45 (m, 1H), 7.19 (d, J=16.2 Hz, 1H), 1.71 (s, 6H). $^{13}$C NMR (176 MHz, CDCl$_3$): δ 184.4, 151,1, 139.7, 136.9, 135.7, 132.7, 131.4 (q, J=32.3 Hz), 130.7, 129.7, 129.4, 129.3, 128.5, 126.5, 125.6 (q, J=3.7 Hz), 124.8, 124.0 (q, J=272.4 Hz), 123.9 (q, J=3.8 Hz), 122.9, 120.9, 120.4, 54.5, 23.0. IR (neat, ν$_{max}$, cm$^{-1}$): 3059, 2975, 2932, 2870, 1328, 1253, 1197, 1163, 1126, 1070, 968, 818, 807, 748. HRMS (ESI-TOF) for C$_{23}$H$_{19}$F$_3$N ([M+H]$^+$) calcd, 366.1464, found 366.1466. R$_f$=0.36 (n-hexane/ethylacetate 6/1 v/v).

Example No. 15. 1,1-Dimethyl-2-[(E)-2-(naphthalen-1-yl)ethenyl]-1H-benzo[e]indole (3o)

Compound 3o was synthesized according to the general synthesis procedure using 1-naphthaldehyde 2o (0.18 mL, 1.5 mmol). After flash chromatography on silica gel (eluent-n-hexane/ethyl acetate 6/1 v/v), 3o was obtained as an orange amorphous material (245 mg, 70% yield).

$^1$H NMR (700 MHZ, CDCl$_3$): δ 8.68 (d, J=15.9 Hz, 1H), 8.34 (d, J=8.5 Hz, 1H), 8.06 (d, J=8.4 Hz, 1H), 7.97-7.82 (m, 6H), 7.60-7.42 (m, 5H), 7.22 (d, J=15.8 Hz, 1H), 1.73 (s, 6H). $^{13}$C NMR (176 MHZ, CDCl$_3$): δ 185.1, 151.2, 139.5, 134.6, 133.7, 133.7, 132.6, 131.5, 129.7, 129.6, 129.2, 128.7, 128.5, 126.6, 126.4, 126.1, 125.6, 124.6, 124.4, 123.7, 122.8, 121.8, 120.4, 54.4, 23.2. IR (neat, ν$_{max}$, cm$^{-1}$): 3055, 3044, 2965, 2928, 2865, 1615, 1510, 1461, 1441, 1394, 1372, 1349, 1251, 1216, 967, 819, 793, 772, 745. HRMS (ESI-TOF) for C$_{26}$H$_{22}$N ([M+H]$^+$) calcd, 348.1747, found 348.1748. R$_f$=0.41 (n-hexane/ethylacetate 6/1 v/v).

Example No. 16. 1,1-Dimethyl-2-[(E)-2-(2-nitrophenyl)ethenyl]-1H-benzo[e]indole (3p)

Compound 3p was synthesized according to the general synthesis procedure using 2-nitrobenzaldehyde 2p (181 mg, 1.2 mmol). After flash chromatography on silica gel (eluent-n-hexane/ethyl acetate 5/3 v/v), 3p was obtained as yellow-orange amorphous material (174 mg, 51% yield).

$^1$H NMR (700 MHz, CDCl$_3$): δ 8.16 (d, J=16.5 Hz, 1H), 8.09 (dd, J=21.0, 8.1 Hz, 2H), 7.97 (d, J=8.2 Hz, 1H), 7.91-7.86 (m, 2H), 7.84 (d, J=7.2 Hz, 1H), 7.69 (t, J=7.5 Hz, 1H), 7.59 (t, J=7.4 Hz, 1H), 7.54-7.47 (m, 2H), 7.18 (d, J=16.5 Hz, 1H), 1.77 (s, 6H). $^{13}$C NMR (176 MHz, CDCl$_3$): δ 184.2, 150.9, 148.2, 140.6, 133.5, 133.0, 132.4, 132.3, 129.8, 129.33, 129.32, 128.5, 128.3, 126.5, 125.9, 125.1, 125.0, 122.9, 120.6, 54.6, 23.7. IR (neat, ν$_{max}$, cm$^{-1}$): 3026, 2965, 2927, 2864 (CH$_{arom}$, CH$_{aliph}$), 1604, 1569, 1514, 1460, 1439, 1336, 1253, 1220, 1204, 965, 860, 824, 792, 742 (—NO$_2$ stretch, C═C, CH$_3$ bending, C—N, CH$_{arom}$ oop bending). HRMS (ESI-TOF) for C$_{22}$H$_{19}$N$_2$O$_2$ ([M+H]$^+$) calcd, 343.1441, found 343.1442. R$_f$=0.66 (n-hexane/ethylacetate 1/1 v/v).

TABLE 1

Compounds prepared by examples No. 1-16

| Cmpd. No | R¹ | R² | R³ | R⁴ | HRMS Calculated | HRMS Found |
|---|---|---|---|---|---|---|
| 3a | —H | —H | —H | —H | 298.1590 | 298.1592 |
| 3b | —H | —CF$_3$ | —H | —CF$_3$ | 434.1338 | 434.1336 |
| 3c | —Cl | —H | —H | —NO$_2$ | 377.1051 | 377.1048 |
| 3d | —H | —H | —F | —H | 316.1496 | 316.1499 |
| 3e | —H | —H | —CF$_3$ | —H | 366.1464 | 366.1467 |
| 3f | —H | —NO$_2$ | —OCH$_3$ | —H | 373.1547 | 373.1550 |
| 3g | —H | —F | —CN | —H | 341.1449 | 341.1446 |
| 3h | —H | —NO$_2$ | —Cl | —H | 377.1051 | 377.1049 |
| 3i | —H | —NO$_2$ | —F | —H | 361.1347 | 361.1345 |
| 3j | —H | —CN | —F | —H | 341.1449 | 341.1452 |
| 3k | —H | —NO$_2$ | —CH$_3$ | —H | 357.1598 | 357.1595 |
| 3l | —H | —CH=CH—CH=CH— | | —H | 348.1747 | 348.1749 |
| 3m | —H | —NO$_2$ | —H | —H | 343.1441 | 343.1439 |
| 3n | —H | —CF$_3$ | —H | —H | 366.1464 | 366.1466 |
| 3o | —CH=CH—CH=CH— | | —H | —H | 348.1747 | 348.1748 |
| 3p | —NO$_2$ | —H | —H | —H | 343.1441 | 343.1442 |

Example No. 17. Optical Properties and Selection of Light Source

The preferred wavelength of the activating radiation is preferably corresponding to the maximum absorption of the given derivative. The radiation can be non-coherent radiation such as from a diode-based source or coherent laser radiation. For surface treatments, a light source may be effective in irradiating specific target areas; for lesions within the body (inner cavities, etc.), an optical fiber apparatus or other devices are needed to irradiate target areas.

To determine the wavelength of light, at which 1,1-dimethyl-2-[(E)-2-phenylethenyl]-1H-benzo[e]indole derivatives should be irradiated for the investigation of their photodynamic activity, the absorption and fluorescence properties thereof were measured in water. The excitation wavelength $\lambda_{ex}$ was set to 380 nm. Based on the results an in-house constructed LED based light source specifically designed for the irradiation of 96-well microplates and Petri dishes (Tomecka et al., CZ302829B6, 2006) was chosen, with a maximal wavelength emission of 414 nm and light intensity set to 20 mW/cm$^2$.

TABLE 2

Absorption and fluorescence characteristics of 1,1-dimethyl-2-[(E)-2-phenylethenyl]-1H-benzo[e]indoles 3a-p in water.

| Compound | $\lambda_{abs}$, nm | $\lambda_{em}$, nm | Stokes shift, nm |
|---|---|---|---|
| 3a | 397 | 530 | 133 |
| 3b | 400 | 509 | 109 |
| 3c | 443 | 541 | 98 |
| 3d | 430 | 532 | 102 |
| 3e | 415 | 531 | 116 |
| 3f | 403 | 549 | 146 |
| 3g | 433 | 535 | 102 |
| 3h | 426 | 532 | 106 |
| 3i | 399 | 525 | 126 |
| 3j | 369 | 523 | 154 |
| 3k | 425 | 523 | 98 |
| 3l | 437 | 523 | 86 |
| 3m | 424 | 513 | 89 |
| 3n | 426 | 520 | 94 |
| 3o | 445 | 558 | 113 |
| 3p | 434 | 566 | 132 |

Example No. 18. Cell Culture and Photodynamic Treatment

For photodynamic treatments, G361 cells (human skin melanoma) were cultivated in DMEM medium without phenol red supplemented with 10% fetal bovine serum, 100 U/mL penicillin, 100 µg/mL streptomycin, 2 mM glutamine, at 37° C. in 5% CO$_2$ atmosphere. Cells were treated with test compounds and after 4 h were irradiated (the maximal wavelength emission of 414 nm and different total doses up to 10 J/cm$^2$). Further cultivation lasted for subsequent 16, 24 or 72 h.

Cell viability (EC$_{50}$) was determined using the MTT (Sigma-Aldrich) assay in 96-well microplates. Cells were seeded, next day treated with test compounds for 4 h and subsequently irradiated (the maximal wavelength emission of 414 nm and total dose of 2.5 and 10 J/cm$^2$). After irradiation, the cells were incubated for further 72 h and then the MTT solution was added. Cells were incubated for another 4 h at 37° C. and then the 0.1% SDS was added to the wells to solubilize the violet formazan crystals. The measurement of absorbance was carried out on reader Tecan Infinite M200Pro at 570 nm. Dark viability was measured in parallel under the same conditions without irradiation.

TABLE 3

EC$_{50}$ values of compounds 3a-p in dark kept and light irradiated (414 nm, 10 J/cm$^2$) G361 cells.

| | G361 - EC$_{50}$ (µM) | |
|---|---|---|
| Compound | Dark | 10 J/cm$^2$ |
| 3a | 5.8 | 2.0 |
| 3b | >10 | 1.3 |
| 3c | 6.9 | 1.2 |
| 3d | 7.3 | 4.1 |
| 3e | 3.6 | 0.5 |
| 3f | 4.9 | 0.2 |
| 3g | 6.2 | 0.6 |
| 3h | 7.2 | 0.3 |
| 3i | 7.8 | 2.1 |
| 3j | 5.1 | 1.3 |
| 3k | 6.9 | 1.3 |
| 3l | >10 | 1.3 |
| 3m | 2.1 | 0.3 |
| 3n | 7.8 | 1.3 |

TABLE 3-continued

EC$_{50}$ values of compounds 3a-p in dark kept and
light irradiated (414 nm, 10 J/cm$^2$) G361 cells.

| Compound | G361 - EC$_{50}$ (μM) | |
|---|---|---|
| | Dark | 10 J/cm$^2$ |
| 3o | >10 | 0.4 |
| 3p | 7.8 | 1.1 |

The data presented in Table 3 shows that all structurally similar compounds of the invention possess photodynamic activity.

TABLE 4

EC$_{50}$ values of compound 3g in G361 cells
irradiated with different light energy.

| light energy | EC$_{50}$ ± SD (μM) |
|---|---|
| Dark | 7.6 ± 0.9 |
| 2.5 J/cm$^2$ | 1.2 ± 0.3 |
| 10 J/cm$^2$ | 0.7 ± 0.1 |

The data in Table 4 shows that the potency of compound 3g is light energy-dependent.

Overall, these results show that the compounds of the invention could be used as photodynamic therapy agents.

Example No. 19. Flow Cytometric Detection of Cell Death

Asynchronous cells were seeded and, after a pre-incubation period, treated with compound 3g for 4 h, irradiated and after further 24 h of incubation, samples were fixed and stained with propidium iodide. DNA content was analyzed by flow cytometry using a 488 nm laser (BD FACS Verse with software BD FACSuite™, version 1.0.6.) and cell cycle distribution was analyzed using ModFit LT (Verity Software House).

The analysis of cellular DNA content of compound 3g treated and irradiated G361 cells by flow cytometry revealed an increase of sub-diploid (sub-G1) populations in both concentration and light irradiation dependent manner (Table 5), indicating that apoptosis could be a probable cause of cell death.

From the data presented in Table 3, which shows that all structurally similar compounds of the invention possess photodynamic activity, and from the data in Table 5, which shows that compound 3g increases sub-diploid (sub-G1) populations in a concentration and light irradiation dependent manner, it can be concluded that the compounds of the invention could be used as apoptosis inducing photodynamic therapy agents.

TABLE 5

Analysis of sub-diploid (sub-G1) populations
in G361 cells treated with compound 3g with
or without light irradiation by flow cytometry.

| | Compound 3g* | | | |
|---|---|---|---|---|
| light energy | 0 μM | 0.3 μM | 1.1 μM | 3.3 μM |
| Dark | 0 | 0 | 0 | 0 |
| 1.1 J/cm$^2$ | 0 | 0 | 0 | + |
| 3.3 J/cm$^2$ | 0 | 0 | + | ++ |

*number of cells in sub-G1 population <10% (0); 10-50% (+) or >50% (++).

Example No. 20. Caspase-3/7 Assay

The cell lysates were incubated for 4 h with 100 μM Ac-DEVD-AMC (the substrate of caspases 3 and 7) in the assay buffer (25 mM PIPES, 2 mM EGTA, 2 mM MgCl$_2$, 5 mM DTT, pH 7.3). The fluorescence of the product was measured using a Fluoroskan Ascent microplate reader (Labsystems) at 355/460 nm (excitation/emission).

Figure 1:
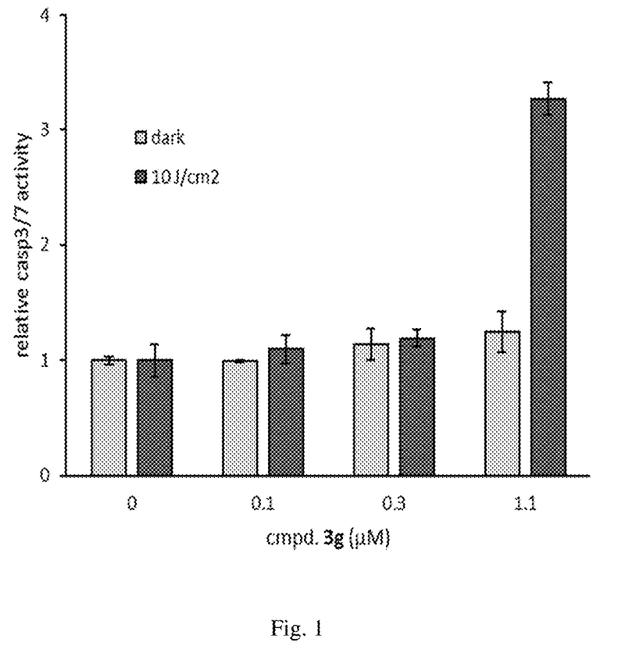
FIG. 1 shows relative caspase 3/7 activity in G361 cells upon treatment with increasing concentrations of compound 3g in combination with light irradiation (10 J/cm$^2$).

To confirm apoptosis as a mechanism of cell death, activity of pro-apoptotic caspases 3 and 7, which are involved in mediating cell death signalling transduction, was quantified upon treatment with compound 3g and light irradiation (FIG. 1). The obtained results confirmed initially observed capacity of compound 3g to induce apoptosis under light irradiation, which was clearly apparent at 1.1 μM+10 J/cm$^2$ treatment.

From the data presented in Table 3, which reveals that all structurally similar compounds of the invention possess photodynamic activity, and from the data in FIG. 1, which reveals that compound 3g induce apoptosis in both concentration and light irradiation dependent manner, it can be concluded that the compounds of the invention could be used as apoptosis inducing photodynamic therapy agents.

Figure 2:
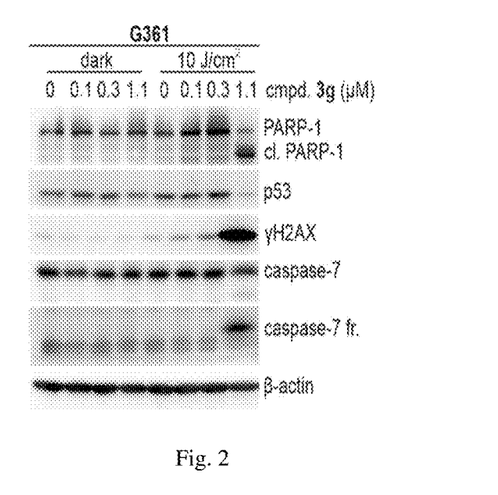
FIG. 2 shows induction of cell death and DNA damage caused by combination of compound 3g and light irradiation (10 J/cm$^2$) in G361 cells analyzed by immunoblotting analysis.

Example No. 21. DNA Damage and Apoptotic Cell Death Confirmation by Immunoblotting Analysis To confirm DNA damage caused by a combination of compound 3g and irradiation in G361 cells, phosphorylation of histone H2A.X at Ser-139 (γH2A.X), which is a well-accepted marker of DNA damage, was evaluated using immunoblotting analysis (FIG. 2). The cells were treated with different doses (0.1, 0.3 or 1.1 μM) of compound 3g for 4 h, then either kept in dark or exposed to light with a total irradiation dose of 10 J/cm$^2$ and cultivated for subsequent 24 h. After this period, the cells were harvested and analyzed by immunoblotting.

The cell lysates were prepared in RIPA buffer. Equal protein amounts were loaded and separated on SDS-polyacrylamide gels, electroblotted onto nitrocellulose membranes and after blocking, overnight incubation with specific primary antibodies and incubation with peroxidase-conjugated secondary antibodies, the peroxidase activity was detected with SuperSignal West Pico reagents (Thermo Scientific) using a CCD camera LAS-4000 (Fujifilm). All primary antibodies were diluted in TBS containing 4% BSA and 0.1% Tween 20. The specific antibodies were purchased from Cell Signaling (anti-PARP-1, clone 46D11; anti-caspase 7; HRP-linked secondary antibodies), Santa Cruz Biotechnology (anti-β-actin, clone C4), Millipore (anti-phospho-histone H2A.X, Ser139, clone JBW301).

Cells kept either in the dark or without compound 3g did not show any H2A.X phosphorylation, but its level increased in compound 3g treated and irradiated cells reaching massive increase at 1.1 μM+10 J/cm$^2$ treatment (FIG. 2). The cleavage of PARP-1, an enzyme involved in DNA repair, which gets cut and inactivated by caspases during apoptotic cell death, was also apparent when combining said concentration and irradiation dose. Finally, cleavage activation of caspase 7 indicated apoptosis, too. Notably, the aforementioned changes could not be observed when the cells were kept in the dark or without exposure to compound 3g. It confirms that the above observation is a consequence of a photodynamic effect.

From the data presented in Table 3, which shows that all structurally similar compounds of the invention possess photodynamic activity, and from the data in FIG. 2, which shows that compound 3g induces cell death and DNA damage in both concentration and light irradiation dependent manner, it can be concluded that the compounds of the invention could be used as apoptosis inducing photodynamic therapy agents.

Example No. 22. Evaluation of Cellular Viability by Microscopy

G361 cells were treated with compound 3g, 4 h later irradiated with 10 J/cm² and further cultivated for 16 h. Control cells were treated with the same compound without irradiation. After the incubation period, cells were stained with propidium iodide (final concentration 10 µg/mL) to evaluate their viability by fluorescence microscopy. In parallel, the morphology of treated cells was evaluated by light microscopy. Experiment clearly confirmed the ability of compound 3g to affect cellular viability after light irradiation in dose-dependent manner as shown by positive propidium iodide staining (>95% of analyzed cells at 1.1 µM of compound 3g+10 J/cm²) as well as significant morphological changes reflecting ongoing cellular death (FIG. 3).

Figure 3:
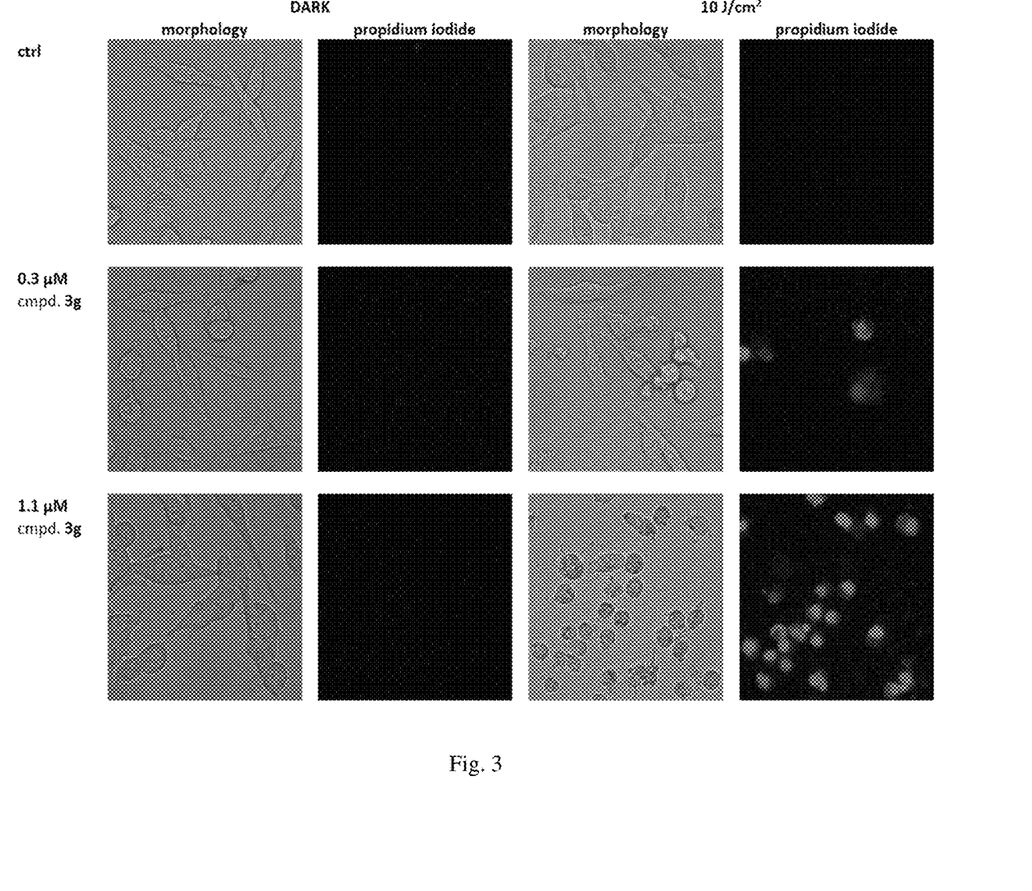
FIG. 3 shows evaluation of cellular viability of G361 cells treated with different doses of compound 3g with or without light irradiation (10 J/cm$^2$) by microscopy techniques.

The data presented in Table 3, which shows that all structurally similar compounds of the invention possess photodynamic activity, in combination with the data in FIG. 3, shows that compound 3g affects cellular viability and induces significant morphological changes reflecting ongoing cellular death upon light irradiation in a dose-dependent manner, allow to conclude that the compounds of the invention could be used as photodynamic therapy agents.

The following numbered clauses present some embodiments and combinations thereof. Further features from the specification may be combined with one or more of the items.

Clause 1. 1,1-Dimethyl-2-[(E)-2-phenylethenyl]-1H-benzo[e]indole derivatives comprising the general formula I (I)

wherein:
R¹ is hydrogen or substituent, selected from NO₂ or Cl;
R² is hydrogen or substituent selected from F, NO₂ or CF₃;
R³ is hydrogen or substituent selected from F, Cl, OCH₃, CF₃ or CH₃;
or R³ is CN on the proviso, that at least R² is F; or R² is CN on the proviso, that R³ represents F;
R⁴ is hydrogen or substituent selected from CF₃ or NO₂;
or alternatively R¹ and R² or R² and R³ together are forming a chain of —CH═CH—CH═CH—.

Clause 2. 1,1-Dimethyl-2-[(E)-2-phenylethenyl]-1H-benzo[e]indole derivative according to clause 1, wherein derivative is selected from the following compounds:
1,1-Dimethyl-2-[(E)-2-phenylethenyl]-1H-benzo[e]indole (3a);
2-{(E)-2-[3,5-Bis(trifluoromethyl)phenyl]ethenyl}-1,1-dimethyl-1H-benzo[e]indole (3b);
2-[(E)-2-(2-Chloro-5-nitrophenyl)ethenyl]-1,1-dimethyl-1H-benzo[e]indole (3c);
2-[(E)-2-(4-Fluorophenyl)ethenyl]-1,1-dimethyl-1H-benzo[e]indole (3d);
1,1-Dimethyl-2-{(E)-2-[4-(trifluoromethyl)phenyl]ethenyl}-1H-benzo[e]indole (3e);
2-[(E)-2-(4-Methoxy-3-nitrophenyl)ethenyl]-1,1-dimethyl-1H-benzo[e]indole (3f);
4-[(E)-2-(1,1-Dimethyl-1H-benzo[e]indol-2-yl)ethenyl]-2-fluorobenzonitrile (3g);
2-[(E)-2-(4-Chloro-3-nitrophenyl)ethenyl]-1,1-dimethyl-1H-benzo[e]indole (3h);
2-(E)-2-(4-Fluoro-3-nitrophenyl)ethenyl-1,1-dimethyl-1H-benzo[e]indole (3i);
5-[(E)-2-(1,1-Dimethyl-1H-benzo[e]indol-2-yl)ethenyl]-2-fluorobenzonitrile (3j);
1,1-Dimethyl-2-[(E)-2-(4-methyl-3-nitrophenyl)ethenyl]-1H-benzo[e]indole (3k);
1,1-Dimethyl-2-[(E)-2-(naphthalen-2-yl)ethenyl]-1H-benzo[e]indole (3l);
1,1-Dimethyl-2-[(E)-2-(3-nitrophenyl)ethenyl]-1H-benzo[e]indole (3m);
1,1-Dimethyl-2-{(E)-2-[3-(trifluoromethyl)phenyl]ethenyl}-1H-benzo[e]indole (3n);
1,1-Dimethyl-2-[(E)-2-(naphthalen-1-yl)ethenyl]-1H-benzo[e]indole (3o);
1,1-Dimethyl-2-[(E)-2-(2-nitrophenyl)ethenyl]-1H-benzo[e]indole (3p);

Clause 3. 1,1-Dimethyl-2-[(E)-2-phenylethenyl]-1H-benzo[e]indole derivatives according to any clause 1 or 2, for use in therapy.
Clause 4. 1,1-Dimethyl-2-[(E)-2-phenylethenyl]-1H-benzo[e]indole derivatives according to clause 3, wherein therapy is photodynamic therapy.
Clause 5. 1,1-Dimethyl-2-[(E)-2-phenylethenyl]-1H-benzo[e]indole derivatives according to any of clauses 1-4 for use for inducing apoptosis in cancer cells.
Clause 6. 1,1-Dimethyl-2-[(E)-2-phenylethenyl]-1H-benzo[e]indole derivatives according to any clause 3 or 4, wherein therapy is photodynamic therapy of skin cancer.
Clause 7. Use of 1,1-dimethyl-2-[(E)-2-phenylethenyl]-1H-benzo[e]indole derivatives according to clause 1 or 2 as anticancer agents in combination with light irradiation.

INDUSTRIAL APPLICABILITY

The novel compounds of this invention can be used per se or as intermediates in the preparation of other compounds having a wide variety of diagnostic, therapeutic and industrial utilities. Novel compounds particularly can be used in photodynamic therapy as photosensitizers to treat cancer.

The invention claimed is:
1. A 1,1-dimethyl-2-[(E)-2-phenylethenyl]-1H-benzo[e]indole derivative consisting of the general formula I

(I)

wherein:
R1 is hydrogen or substituent, selected from NO2 or Cl;
R2 is hydrogen or substituent selected from F, NO2 or CF3;
R3 is hydrogen or substituent selected from F, CI, OCH3, CF3 or CH3;
or R3 is CN on the proviso, that at least R2 is F; or R2 is CN on the proviso, that R3 represents F;
R4 is hydrogen or substituent selected from CF3 or NO2;
or alternatively R1 and R2 or R2 and R3 together are forming a chain of —CH═CH—CH═CH—.

2. A 1,1-dimethyl-2-[(E)-2-phenylethenyl]-1H-benzo[e]indole derivative according to claim 1, wherein derivative is selected from the following compounds:
   1,1-Dimethyl-2-[(E)-2-phenylethenyl]-1H-benzo[e]indole (3a);
   2-{(E)-2-[3,5-Bis(trifluoromethyl)phenyl]ethenyl}-1,1-dimethyl-1H-benzo[e]indole (3b);
   2-[(E)-2-(2-Chloro-5-nitrophenyl)ethenyl]-1,1-dimethyl-1H-benzo[e]indole (3c);
   2-[(E)-2-(4-Fluorophenyl)ethenyl]-1,1-dimethyl-1H-benzo[e]indole (3d);
   1,1-Dimethyl-2-{(E)-2-[4-(trifluoromethyl)phenyl]ethenyl}-1H-benzo[e]indole (3e);
   2-[(E)-2-(4-Methoxy-3-nitrophenyl)ethenyl]-1,1-dimethyl-1H-benzo[e]indole (3f);
   4-[(E)-2-(1,1-Dimethyl-1H-benzo[e]indol-2-yl)ethenyl]-2-fluorobenzonitrile (3g);
   2-[(E)-2-(4-Chloro-3-nitrophenyl)ethenyl]-1,1-dimethyl-1H-benzo[e]indole (3h);
   2-(E)-2-(4-Fluoro-3-nitrophenyl)ethenyl-1,1-dimethyl-1H-benzo[e]indole (3i);
   5-[(E)-2-(1,1-Dimethyl-1H-benzo[e]indol-2-yl)ethenyl]-2-fluorobenzonitrile (3j);
   1,1-Dimethyl-2-[(E)-2-(4-methyl-3-nitrophenyl)ethenyl]-1H-benzo[e]indole (3k);
   1,1-Dimethyl-2-[(E)-2-(naphthalen-2-yl)ethenyl]-1H-benzo[e]indole (3l);
   1,1-Dimethyl-2-[(E)-2-(3-nitrophenyl)ethenyl]-1H-benzo[e]indole (3m);
   1,1-Dimethyl-2-{(E)-2-[3-(trifluoromethyl)phenyl]ethenyl}-1H-benzo[e]indole (3n);
   1,1-Dimethyl-2-[(E)-2-(naphthalen-1-yl)ethenyl]-1H-benzo[e]indole (3o); and
   1,1-Dimethyl-2-[(E)-2-(2-nitrophenyl)ethenyl]-1H-benzo[e]indole (3p).

3. A 1,1-dimethyl-2-[(E)-2-phenylethenyl]-1H-benzo[e]indole derivative according to claim 1, for use in therapy.

4. A 1,1-dimethyl-2-[(E)-2-phenylethenyl]-1H-benzo[e]indole derivative according to claim 3, wherein therapy is photodynamic therapy.

5. A 1,1-dimethyl-2-[(E)-2-phenylethenyl]-1H-benzo[e]indole derivative according to claim 1 for use for inducing apoptosis in cancer cells.

6. A 1,1-dimethyl-2-[(E)-2-phenylethenyl]-1H-benzo[e]indole derivative according to claim 4, wherein therapy is photodynamic therapy of skin cancer.

7. A method to induce apoptosis in cancer cells, wherein the method comprises treating the cells with a 1,1-dimethyl-2-[(E)-2-phenylethenyl]-1H-benzo[e]indole derivative of claim 1 as photodynamic sensitizers.

* * * * *